T. CARENCE & E. W. SUMPTER.
HOSE COUPLING.
APPLICATION FILED SEPT. 23, 1912.
1,074,244.
Patented Sept. 30, 1913.
2 SHEETS—SHEET 1.
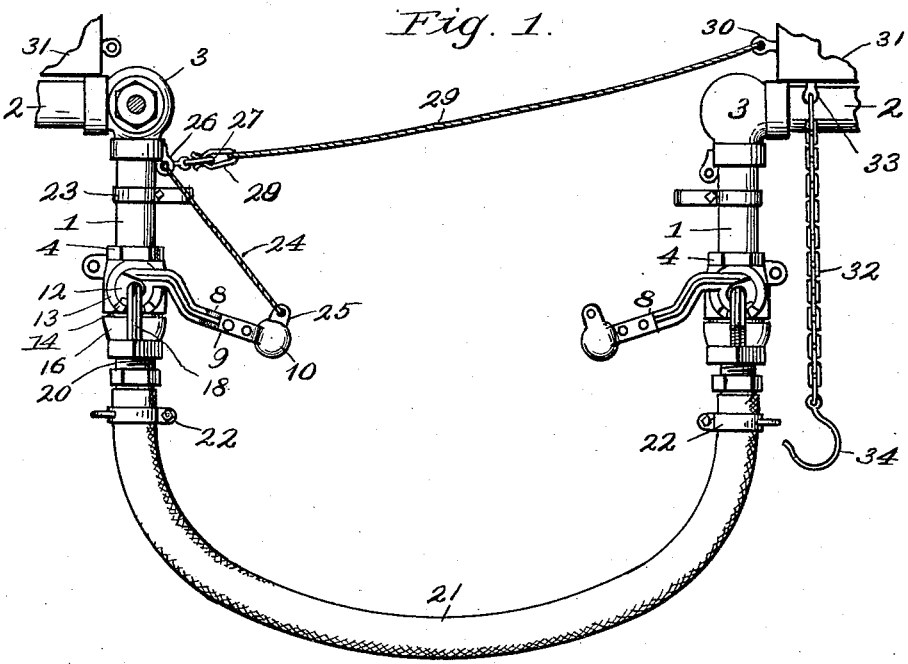
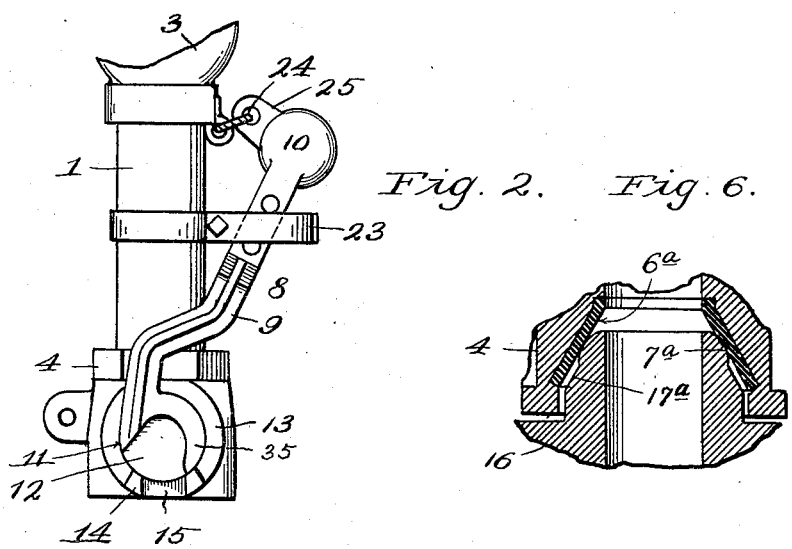
WITNESSES:
INVENTORS:
Thomas Carence
and Ernest W. Sumpter,
BY
ATTORNEY.

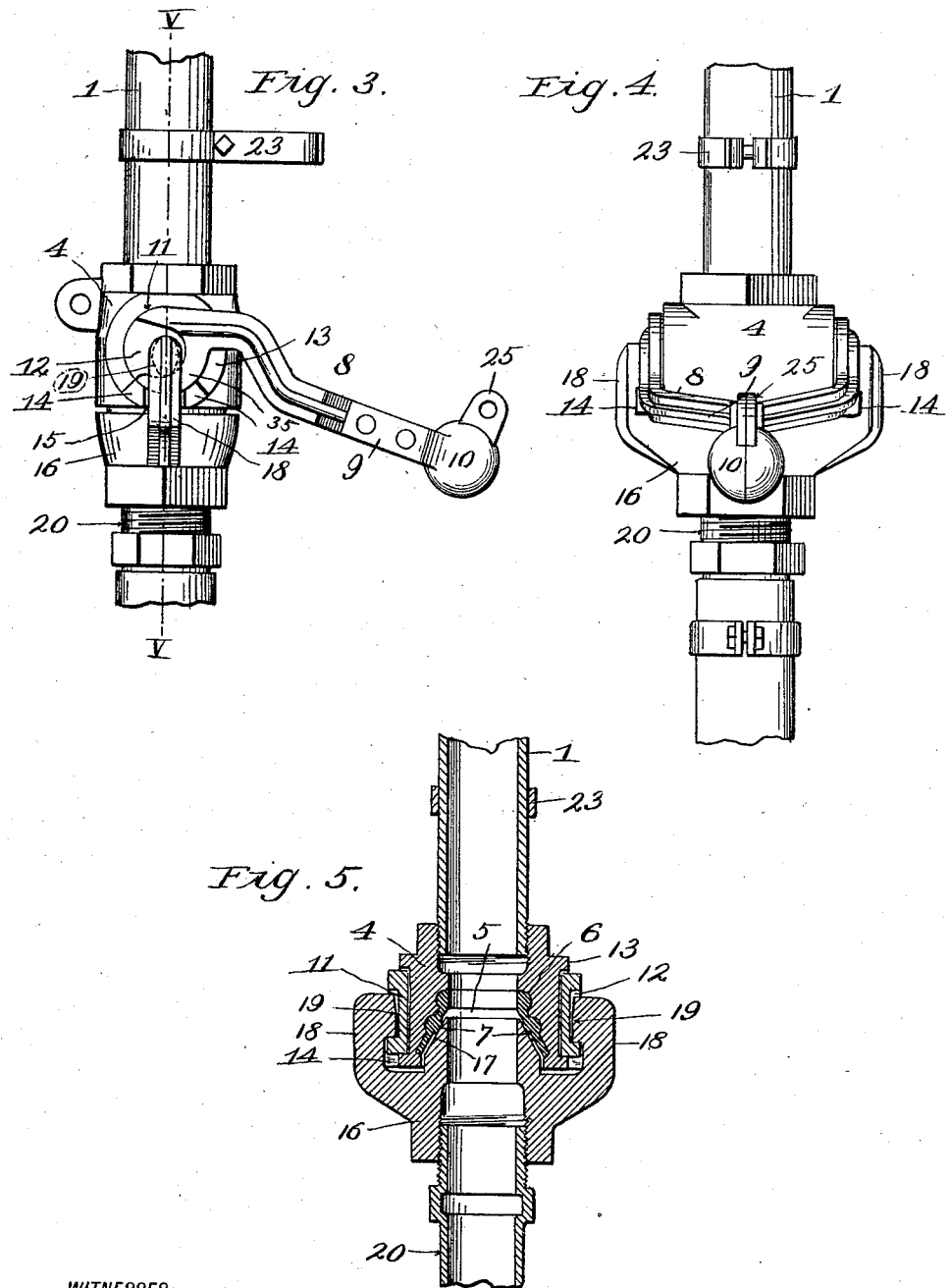

UNITED STATES PATENT OFFICE.

THOMAS CARENCE AND ERNEST W. SUMPTER, OF KANSAS CITY, MISSOURI.

HOSE-COUPLING.

1,074,244.　　　　　　Specification of Letters Patent.　　Patented Sept. 30, 1913.

Application filed September 23, 1912. Serial No. 721,948.

*To all whom it may concern:*

Be it known that we, THOMAS CARENCE and ERNEST W. SUMPTER, citizens of the United States, residing at Kansas City, in the county of Jackson and State of Missouri, have invented certain new and useful Improvements in Hose-Couplings, of which the following is a specification.

Our present invention relates to that class of couplings particularly adapted for coupling a hose to the line pipes of air brakes and steam heating systems of railway cars, and is an improvement over the hose coupling disclosed by our copending application, filed Oct. 7, 1912, Serial No. 653,409., Our objects are to provide a coupling which will retain air, steam, or other fluid under pressure without leaking, one which can be readily coupled without requiring the operator to pass between cars, and one which will automatically uncouple when the cars are uncoupled and drawn apart from each other.

Our coupling may also be used to advantage for coupling fire-hose to water plugs, and other purposes, and in order that the invention may be fully understood, reference will now be made to the accompanying drawings, in which:

Figure 1 is a side elevation of the invention in operative position. Fig. 2 is a side elevation of one of the coupling members in position to receive the companion coupling member. Fig. 3 is a side elevation of the coupling members connected to each other. Fig. 4 is a front elevation of the coupling members connected. Fig. 5 is a longitudinal section on line V—V of Fig. 3. Fig. 6 is a broken longitudinal section of a modified form of the invention.

1—1 designate two short pieces of pipe, communicating with two line pipes 2—2 through the intermediary of angle-valves 3—3. The line pipes 2—2 extend beneath two railway cars (not shown) for the purpose of conducting air to the air-brakes or steam to the heating system, installed on the cars. Each pipe 1, is provided at its lower threaded end with a coupling member 4, having a conical socket 5, lined with Babbitt or other comparatively soft metal 6, having an internal annular shoulder 7.

8 designates a cam locking member, comprising a lever 9, a weight 10 at one end of said lever, and a pair of disks 11, integral with the ends of the bifurcated portion of lever 9. The outer faces of disks 11, have eccentric recesses 12, for a purpose which will hereinafter appear. Disks 11, are journaled in annular flanges 13, projecting from opposite sides of the coupling member 4, and having integral guides 14 at opposite sides of openings 15 in said flanges.

16 designates a companion coupling member, having an integral nozzle 17, adapted to enter the conical socket 5 in the coupling member 4, and be seated in the annular shoulder 7, as shown of Fig. 5. Coupling member 16 is provided with a pair of oppositely-disposed jaws 18, the upper free ends of which have inwardly-extending lugs 19, preferably elliptical in cross section, so that they may readily pass through openings 15, when coupling or uncoupling the members 4 and 16.

20—20 designate nipples, screwed into the lower ends of coupling members 16 to receive the end of a hose 21, secured thereto by clamps 22.

23—23 designate clamps, secured to pipes 1 for the purpose of holding the cam-locking members 8 in the raised position, shown on Fig. 2.

24 designates a cable attached at one end to an eye 25 on weight 10, and extending through an eye 26, on the adjacent angle-valve 3. The upper end of cable 24, is provided with a ring 27, adapted to receive a resilient clasp 28, attached to one end of a cable 29, the opposite end of which is secured to an eye 30, with which each car-transom 31 is provided.

32 designates a chain, depending from an eye 33 and provided at its lower end with a hook 34, whereby the free end of hose 21 may be supported, when the hose has been uncoupled at its end most remote from eye 33.

In practice one end of the hose is, preferably, permanently coupled to one of the short pipes 1, so that when two cars come together, the free end of the hose may be grasped with both hands to effect the coupling of said free end to the short pipe 1, on the other car. The cable 29 is attached to the car on which the hose is to be left, so that when the cars are uncoupled and drawn apart from each other the hose is automatically uncoupled from the other car by said cable 29, pulling upward on the cam locking member 8, until said cam locking member is grasped by the adjacent clamp 23.

When this occurs, the mouths of the recesses 12 are in coincidence with openings 15, as shown on Fig. 2, and allow the lugs 19 on the opposing coupling member to drop down through said openings and thus effect the uncoupling of members 4 and 16. After the cam locking member 8 has been drawn upward into engagement with its respective clamp 23, the pull of cable 29 causes clasp 28 to release ring 27 and thus prevent breaking either cable 24 or 29.

In coupling the members 4 and 16, nozzle 17 is firmly drawn against the annular shoulder 7, by the eccentric shoulders 35 on disks 11, engaging the under sides of lugs 19, and said coupling members are reliably held in coupled position by the downward pressure of lever 9 and weight 10 on said shoulders 35.

In the modified form disclosed by Fig. 6, the construction of the coupling members is identical to that of the preferred form, except that nozzle 17$^a$ has an annular shoulder 7$^a$ to engage the Babbitt lining 6$^a$ in the companion coupling member.

Having thus described our invention, what we claim and desire to secure by Letters-Patent is:

1. A hose coupling consisting of two interengaging members, a pair of annular flanges secured on opposite sides of one of said members each formed with an opening which extends through the flange periphery, a guide on each side of each opening, a pair of oppositely disposed jaws carried by the other member, an inwardly extending lug formed on each jaw for engagement through said respective openings of the flanges, a disk journaled in each of said annular flanges, and a lever having a bifurcated portion the ends of which latter are secured to said disks, the outer face of each disk having an eccentric recess the mouths of which recesses extend through the disk peripheries and are for registry with the respective openings of the flanges to admit the lugs of the second named member on the interiors of said eccentric recesses, said lugs being engaged by the walls formed by the eccentric recesses and being actuated thereby when the lever is operated.

2. A hose coupling embodying two interengaging members, a flange on each side of one of said members formed with an opening which extends through the flange periphery, a pair of jaws carried by the other member for engagement through the respective openings of the flanges, a disk rotatably supported by each flange, and a lever having one end secured to the disks, each disk having an eccentric recess the mouths of which extend through the disk peripheries and are for registry with the respective openings of the flanges to admit the jaws of the second named member on the interiors of said eccentric recesses, said lugs being engaged by the walls formed by the eccentric recesses and being actuated thereby when the lever is operated.

In testimony whereof we affix our signatures, in the presence of two witnesses.

THOMAS CARENCE.
ERNEST W. SUMPTER.

Witnesses:
F. G. FISCHER,
L. J. FISCHER.

---

Copies of this patent may be obtained for five cents each, by addressing the "Commissioner of Patents, Washington, D. C."